US010824387B2

(12) United States Patent
Barton et al.

(10) Patent No.: US 10,824,387 B2
(45) Date of Patent: *Nov. 3, 2020

(54) AUDIO SYSTEM WITH MULTI-SCREEN APPLICATION

(71) Applicant: HARMAN INTERNATIONAL INDUSTRIES, INCORPORATED, Stamford, CT (US)

(72) Inventors: Sean F. Barton, Los Angeles, CA (US); Robert J. Mason, Los Angeles, CA (US)

(73) Assignee: Harman International Industries, Incorporated, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/017,057

(22) Filed: Jun. 25, 2018

(65) Prior Publication Data

US 2018/0307460 A1 Oct. 25, 2018

Related U.S. Application Data

(63) Continuation of application No. 15/253,224, filed on Aug. 31, 2016, now Pat. No. 10,031,719.
(Continued)

(51) Int. Cl.
*G06F 3/16* (2006.01)
*H04N 21/472* (2011.01)
(Continued)

(52) U.S. Cl.
CPC .......... *G06F 3/165* (2013.01); *H04N 21/439* (2013.01); *H04N 21/47217* (2013.01);
(Continued)

(58) Field of Classification Search
CPC .. H04N 21/439; H04N 21/47217; H04R 3/12; H04R 5/04; H04R 27/00;
(Continued)

(56) References Cited

U.S. PATENT DOCUMENTS

2007/0060054 A1 3/2007 Romesburg
2009/0273705 A1 11/2009 Matsumoto et al.
(Continued)

FOREIGN PATENT DOCUMENTS

| CN | 101039398 A | 9/2007 |
| CN | 101263703 A | 9/2008 |
| CN | 104115224 A | 10/2014 |

OTHER PUBLICATIONS

Allshare Play, by Samsung <www.samsung.com/us/2012-allshare-play/>, accessed May 12, 2015, 2 pages.
(Continued)

*Primary Examiner* — David L Ton
(74) *Attorney, Agent, or Firm* — Brooks Kushman, P.C.

(57) ABSTRACT

A playback device for automatically switching between audio content received from a plurality of media devices may include at least one speaker configured to emit first audio content corresponding to video content received from a first media device. The playback device may also include a wireless transceiver configured to receive data from a second media device and a processor. The processor may be configured to receive an indication of an event at the second media device based on the data, the event indicative of second audio content to be played from the second media device, and instruct the at least one speaker to mute playback of the first audio content and to initiate playback of the second audio content without discontinuing playback of the video content at the first media device.

20 Claims, 9 Drawing Sheets

Related U.S. Application Data

(60) Provisional application No. 62/213,259, filed on Sep. 2, 2015.

(51) Int. Cl.
*H04N 21/439* (2011.01)
*H04R 3/12* (2006.01)
*H04R 5/04* (2006.01)
*H04R 27/00* (2006.01)

(52) U.S. Cl.
CPC ............... *H04R 3/12* (2013.01); *H04R 5/04* (2013.01); *H04R 27/00* (2013.01); *H04R 2227/003* (2013.01); *H04R 2420/01* (2013.01); *H04R 2420/07* (2013.01); *H04R 2430/01* (2013.01)

(58) Field of Classification Search
CPC .......... H04R 2227/003; H04R 2220/01; H04R 2220/07; H04R 2230/01

USPC .................................. 381/77; 455/41.2, 41.3
See application file for complete search history.

(56) References Cited

U.S. PATENT DOCUMENTS

| | | |
|---|---|---|
| 2011/0004330 A1 | 1/2011 | Rothkopf et al. |
| 2011/0128452 A1 | 6/2011 | Kim et al. |
| 2011/0252443 A1 | 10/2011 | Tiddens |
| 2011/0301728 A1 | 12/2011 | Hamilton et al. |
| 2014/0047464 A1 | 2/2014 | Lev et al. |
| 2014/0078039 A1 | 3/2014 | Woods et al. |
| 2014/0223461 A1 | 8/2014 | Hatambeiki et al. |
| 2014/0359151 A1 | 12/2014 | Hansen et al. |

OTHER PUBLICATIONS

Anonymous, "Owner's Manual—300W Sound Bar System NB3520A (NB3520A, SHS36-D)", Feb. 24, 2012 (Feb. 24, 2012), 28 pages, XP055332803, Retrieved from the Internet: uhttps://s3-us-west-2. amazonaws.com/www.mrcdn.com/pdf/lg/lg-nb3520a-dgbr lk-owners-manual.pdf on Jan. 6, 2017.

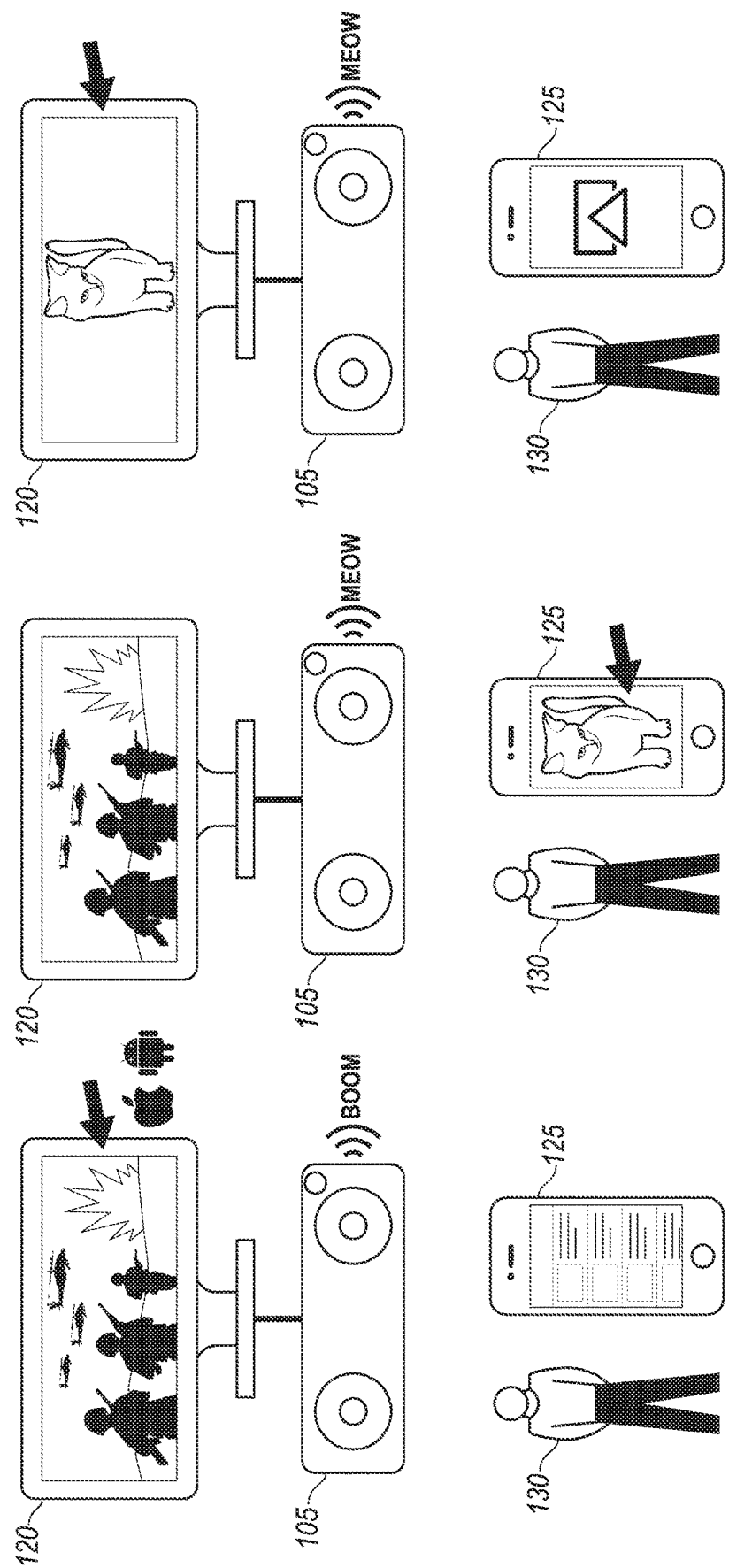

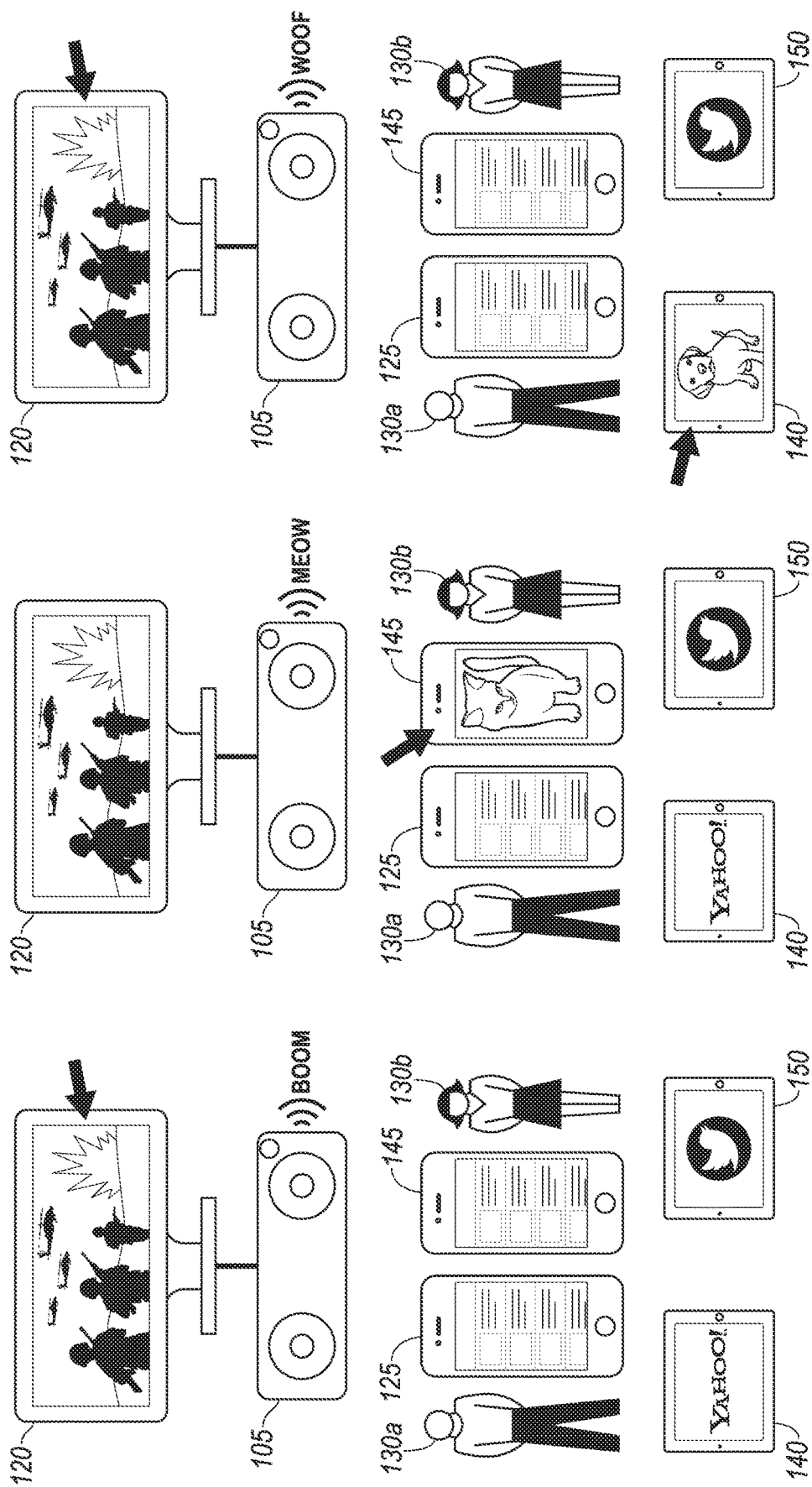

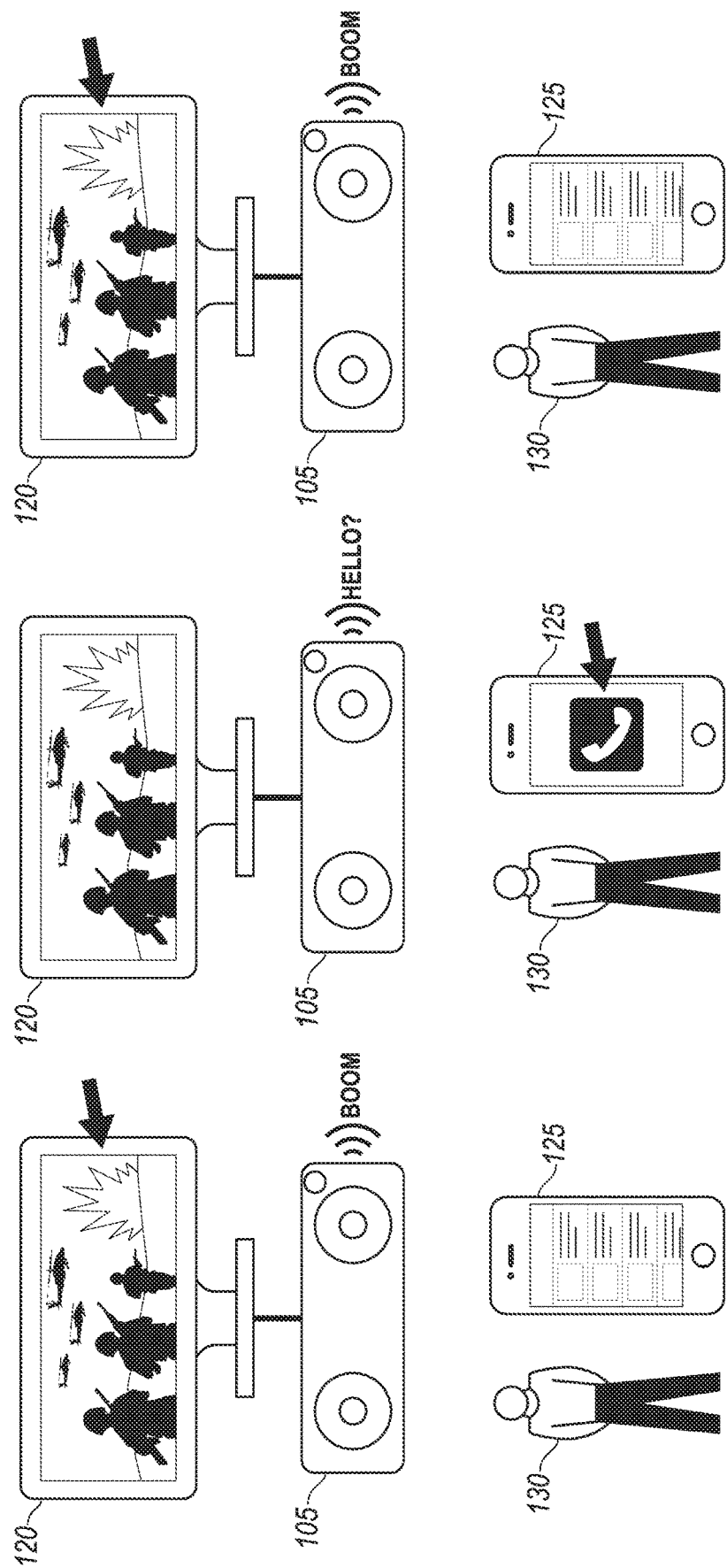

AUDIO SYSTEM WITH MULTI-SCREEN APPLICATION

CROSS-REFERENCE TO RELATED APPLICATIONS

This application is a continuation of U.S. application Ser. No. 15/253,224 filed Aug. 31, 2016, now U.S. Pat. No. 10,031,719 issued Jul. 24, 2018, which, in turn, claims the benefit of U.S. provisional application Ser. No. 62/213,259, filed Sep. 2, 2015, the disclosures of which are hereby incorporated in their entirety by reference herein.

TECHNICAL FIELD

Disclosed herein are audio systems with multi-screen applications.

BACKGROUND

Home audio systems are becoming increasingly popular. Many speakers within the home audio system are wirelessly enabled and configured to connect with certain devices within the home such as televisions, computers, tablets, mobile phones, etc. Often times multiple devices compete for a user's attention.

SUMMARY

A playback device for automatically switching between audio content received from a plurality of media devices may include at least one speaker configured to emit first audio content corresponding to video content received from a first media device. The playback device may also include a wireless transceiver configured to receive data from a second media device and a processor. The processor may be configured to receive an indication of an event at the second media device based on the data, the event indicative of second audio content to be played from the second media device, and instruct the at least one speaker to mute playback of the first audio content and to initiate playback of the second audio content without discontinuing playback of the video content at the first media device.

An audio playback system configured to switch between a plurality of audio sources may include a playback device including at least one speaker configured to emit first audio content corresponding to video content at a first media device. The playback device further including a processor configured to receive, from a second media device, an indication of second audio content to be played from the second media device, and instruct the at least one speaker to mute playback of the first audio content and to initiate playback of the second audio content without discontinuing playback of the video content at the first media device.

A method for switching audio output at a home theater playback device may include receiving, from a first media device, first audio content corresponding to multimedia content at the first media device. The method may further include instructing the first media content to be played via at least one speaker and receiving, from a second media device, second audio content corresponding to media content at the second media device. The method may further include instructing the at least one speaker to mute playing the first media content and to play the second media content without discontinuing video content at the first media device, and instructing the at least one speaker to resume play of the first audio content in response to the second media content ending.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIGS. 4A-4C illustrate an example scenario for the audio system when media is played at a second media device and streamed to a first audio device;

FIGS. 5A-5C illustrate an example scenario for the audio system when multiple user and media devices are in communication with the playback device;

FIGS. 6A-6C illustrate example scenarios for the audio system when a phone call is received at a second media device;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a playback device, or speaker, configured to connect to and automatically switch between media content received from multiple in-home devices. The in-home devices may include wired devices, such as a television, and one or more wireless mobile devices, such as a mobile phone or tablet. The playback device may be configured to play audio corresponding to the video stream currently being played via a first in-home device, such as the television. During playback, a second in-home device, such as the mobile device, may also begin to play audio (e.g., from a video currently playing on the mobile device, from an incoming phone call, etc.). The playback device may detect the audio playback at the mobile device, mute the audio corresponding to the currently-played video stream, and begin playing the audio from the mobile device without discontinuing the video stream. Responsive to the playback device detecting cessation of the audio playback at the mobile device, the playback device may resume the audio playback corresponding to the video stream. This switching between audio sources occurs without interaction from the user. Accordingly, an improved user experience may be achieved via the playback device at least because audio corresponding with content that the user is most interested in is automatically chosen by the playback device, avoiding situations in which multiple in-home devices provide competing concurrently-played content.

Figure 1:
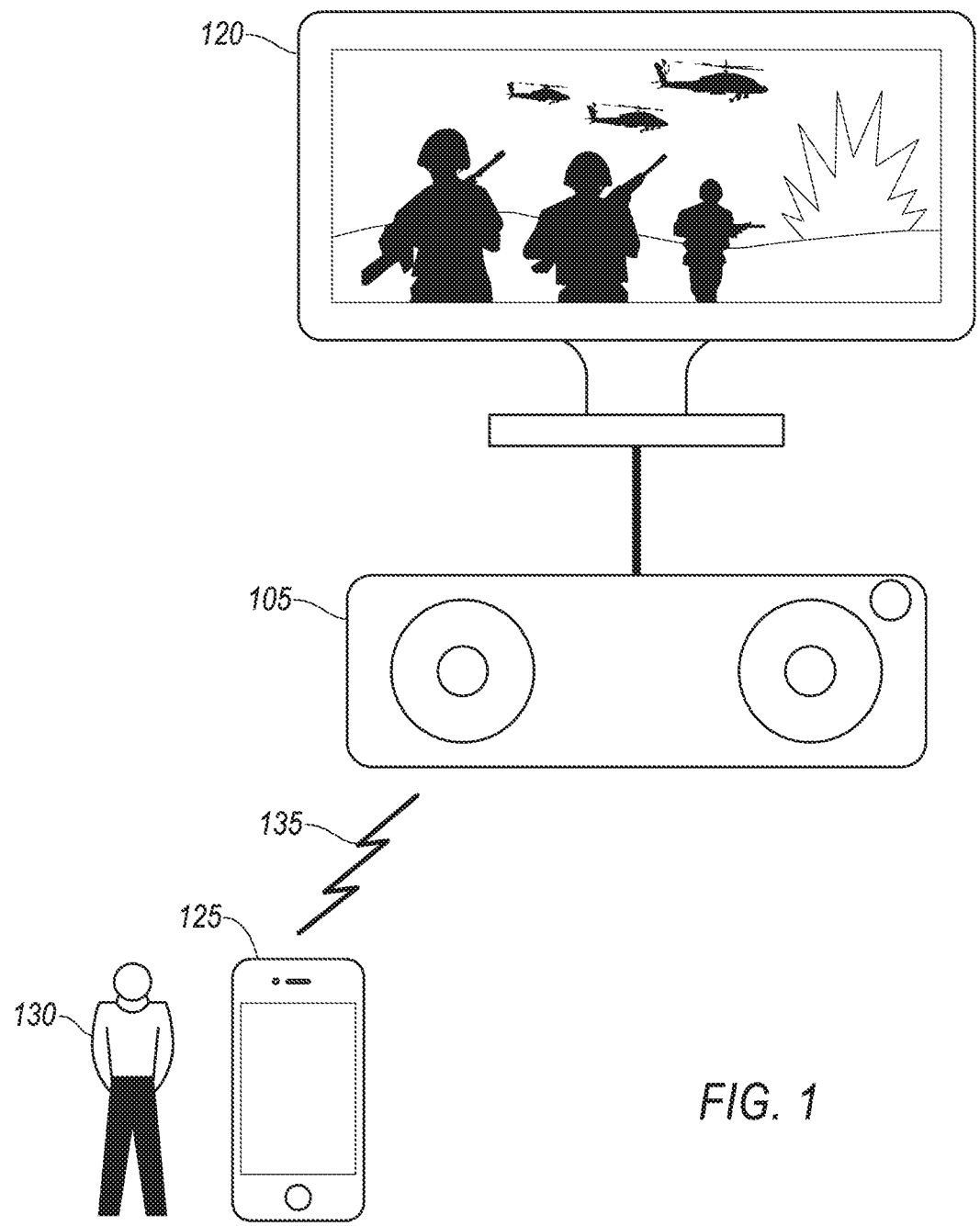
FIG. 1 illustrates a system diagram of an audio system in accordance with one embodiment.

FIG. 1 illustrates a system diagram of a home audio system 100 having a playback device 105 paired with a first media device 120 and a second media device 125. The first media device 120 may be a media playback device having a display screen such as a television, monitor, tablet computer, etc. The second media device 125 may also be a media playback device. In the examples discussed herein, the first media device 120 may be a mounted screen such as a television. The first media device 120 may be configured to play media content such as audio and/or video content. The second media device 125, in the examples discussed herein, may be a mobile device such as a tablet or mobile phone and may be operable by a nearby user 130. Other configurations where the first media device 120 is also a mobile device may be implemented as well.

The playback device 105 may be an audio speaker such as a soundbar, home theater speaker, bookshelf speaker, in-wall speaker, all weather outdoor speaker, subwoofer, etc. The playback device 105 may be configured to wirelessly communicate with the media devices 120, 125. Upon connecting with one of the media devices 120, 125, the playback device 105 may emit audio corresponding to the media content at one of the media devices 120, 125. Typically, responsive to selection of media content at the first media device 120, the playback device 105 may emit audio corresponding to the media content. Although shown in FIG. 1 as being proximate to the first media device 120, the playback device 105 may be located anywhere within a room, such as in the corners, back of the room, etc., to provide various surround sound effects. Moreover, while the examples discussed herein relate to a single playback device 105, multiple playback devices 105 may be used, for instance as components of a 2.0 channel or 5.1 channel systems.

The playback device 105 may communicate with the second media device 125 via a wireless network 135. In one example, the wireless network 135 may be a local area wireless network 135 that is configured to routinely pair with the media devices 120, 125. The first media device 120 may have a wired analog connection with the playback device 105 at an auxiliary port.

When one of the media devices 120, 125 is activated or turned on (e.g., a television), or when one of the media devices 120, 125 (e.g., a mobile device) comes within wireless range of the playback device 105, the media devices 120, 125 may respond to a request message from the playback device 105. The response to the request message may include unique identifiers used to authenticate the media devices 120, 125 with the playback device 105. After an initial pairing, the media device 120, 125 may subsequently use the received identifiers to be recognized by the playback device 105 without further interaction from the user. The wireless networks may include Bluetooth®, Wi-Fi®, or other short-range networks over which media content may be transmitted from the media devices 120, 125 to the playback device 105.

In use, the user 130 may select a television program to watch on the first media device 120 and the playback device 105 may play audio corresponding to the television program. The user 130 may concurrently interact with the second media device 125. This may include checking email, social networking sites, online merchants, etc. Occasionally, the user 130 may select to view a video clip at the second media device 125 (e.g., selecting a short video on YouTube®). Responsive to this selection, the audio corresponding to the selected video clip may be emitted via the playback device 105. This may be beneficial because while the user selected a first content at the first media device 120, the user may be more interested in the second content at the second media device 125. The playback device 105, responsive to receiving indication of audio playback at the second media device 125, may override the currently played audio content and playback the second audio content corresponding to the second content selected at the second media device 125. Responsive to completion of the video clip at the second media device 125, the playback device may revert to the first audio content corresponding to the first content.

That is, by selecting to override the first audio content with the second audio content, the media devices 120, 125 are not competing for the user's attention. Instead, the playback device 105 plays back the audio content corresponding to the more preferred content without undue interaction from the user 130. The automatic override may also eliminate the need for user interaction to mute the audio at the first media device 120.

Thus, the playback device 105 may default to play the audio corresponding to the first media device 120. This audio may be interrupted in response to an event at the second media device 125 such as the user selecting to play a video clip. Other events, such as receiving a phone call, playing an audio file, etc., may also trigger the playback device 105 to switch audio sources, at least temporarily. In some situations, mechanisms to reduce latency that may occur when using Bluetooth® may be implemented, such as aptX® audio enhancement technology provided by Qualcomm® Incorporated.

The wireless network 135 may permit the second media device 125 to communicate with the playback device 105. The second media device 125 may routinely transmit packets of data to the playback device 105. The playback device 105 may determine, based on the received data, whether an event at the second media device 125 includes corresponding audio content. For example, the event may include playing a video having corresponding audio. The event may also include receiving a phone call or video call. Upon recognizing an event with corresponding audio, the playback device 105 may then switch to emit the corresponding audio instead of the audio corresponding to the first media device 120.

Figure 2:
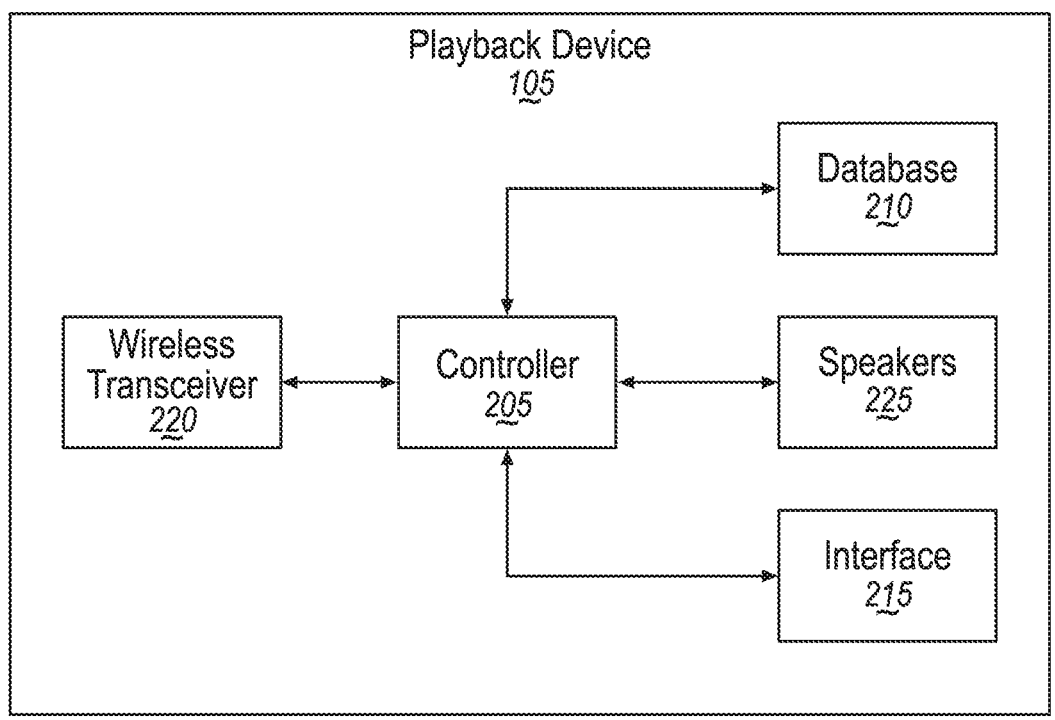
FIG. 2 illustrates a block diagram for a playback device of the audio system in accordance with one embodiment.

FIG. 2 illustrates a block diagram for the playback device 105 in accordance with one embodiment. The playback device 105 may include a controller 205 configured to facilitate the listening experience for the user 130. The controller 205 may be in communication with a database 210, the user interface 215 and speakers 225. The controller 205 may also be in communication with a wireless transceiver 220. The transceiver 220 may be capable of receiving signals from remote devices, such as the first media device 120 and the second media device 125, and providing the signals to the controller 205 for playback through the speakers 225. Other information and data may be exchanged via the transceiver 220 such as user settings, playlists, settings, etc. As explained, communications between the playback device 105 and the media devices 120, 125 may be facilitated via a Bluetooth® network or over Wi-Fi®. Bluetooth® or Wi-Fi® may be used to stream media content, such as music from the mobile device to the playback device 105 for playback. The controller 205 may include audio decoding capabilities for Bluetooth® technology.

The database 210 may be located within the playback device 105 and may maintain various user settings, device configurations, look-up tables, etc. The database 165 may also be located on the remote media device, or other location. The database 210 may maintain certain preset values, as well as certain predefined or predetermined thresholds, as discussed herein. The database 210 may also maintain a timeline of events at the media devices 120, 125 that may indicate audio content thereat. The database 210 may maintain a list of devices and a hierarchy associated with the same.

The user interface 215 may be a switch, a liquid crystal display (LCD), or any other type of interface configured to receive user commands. Although not shown, the playback device 105 may also be controlled by a wireless remote control, or even from the second media device 125. The received commands may be related to playback of the audio and may include volume commands, as well as playback commands such as skip, fast forward, etc. The interface 215 may also display an indication of the currently played audio, or may indicate the source of the audio (e.g., the first media device 120 or the second media device 125).

Figures 3A, 3B, 3C:
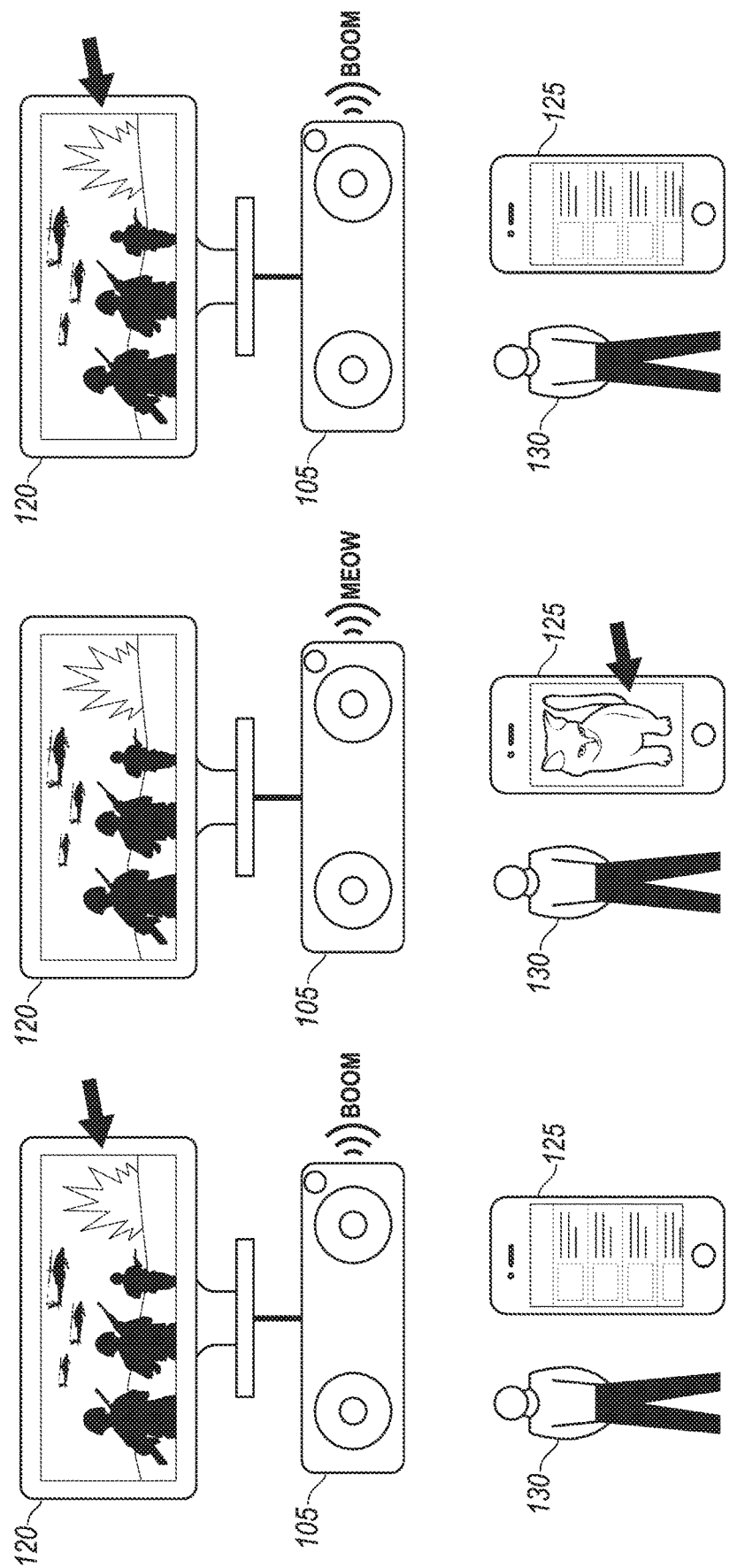
FIGS. 3A-3C illustrate an example scenario for the audio system when media is played at a second media device.

FIGS. 3A-C illustrate an example scenario where audio from the second media device 125 interrupts audio from the first media device 120. For example, the user 130 may be watching television at the first media device 120, as illustrated in FIG. 3A. Subsequently, the user 130 may select a video clip to be played back at the second media device 125, as illustrated in FIG. 3B. The playback device 105 may recognize that the second media device 125 is playing, or about to play, audio content and may switch from playing audio corresponding to the television content, to the audio corresponding to the video clip at the second media device 125. Once the video clip has finished playing at the second media device 125, the playback device 105 may revert to playing audio corresponding to the television content, as illustrated in FIG. 3C.

FIGS. 4A-C illustrate an example scenario where audio from the second media device 125 interrupts audio from the first media device 120 and video content from the second media device 125 is cast to the first media device 120. For example, the user 130 may be watching television at the first media device 120, as illustrated in FIG. 4A. Subsequently, the user 130 may select a video clip to be played back at the second media device 125, as illustrated in FIG. 4B. The playback device 105 may recognize that the second media device 125 is playing, or about to play, audio content and may switch from playing audio corresponding to the television content, to the audio corresponding to the video clip at the second media device 125. The user 130 may then cast the video to the first media device 120, as illustrated in FIG. 4C. Once the video clip has finished playing at the second media device 125, the playback device 105 may automatically revert to playing audio corresponding to the television content and the first media device 120 may automatically revert to playing the previously interrupted content.

FIGS. 5A-C illustrate an example scenario where multiple media devices are paired with the playback device 105. In the example shown, a first media device 120 such as a television and a second media device 125 corresponding to a first user 130-A are paired with the playback device 105. Additionally, a third media device 140, such as a tablet computer corresponding to the first user 130-A, may also be paired with the playback device 105. A fourth media device 145, such as a mobile phone, and a fifth media device 150, such as a tablet, may be corresponding to a second user 130-B and also be paired with the playback device 105.

The users 130-A, 130-B may be watching television at the first media device 120, as illustrated in FIG. 5A. Subsequently, the second user 130-B may select a video clip to be played at the fourth media device 145, as illustrated in FIG. 5B. The playback device 105 may recognize that the fourth media device 145 is playing, or about to play, audio content and may switch from playing audio corresponding to the television content, to the audio corresponding to the video clip at the fourth media device 145. Although not shown, once the video clip has finished playing at the fourth media device 145, the playback device 105 may automatically revert to playing audio corresponding to the television content.

The first user 130-A may then select a video clip at the third media device 140, as illustrated in FIG. 5C. The playback device 105 may recognize that the third media device 140 is playing, or about to play, audio content and may switch from playing audio associated with the television content, to the audio corresponding to the video clip at the third media device 140. Although not shown, once the video clip has finished playing at the third media device 140, the playback device 105 may automatically revert to playing audio corresponding to the television content.

In the event that multiple media devices are concurrently playing audio, the playback device 105 may select to play audio based on a last-in-first-out (LIFO) implementation. That is, the most recent media device to play audio would have audio playback priority.

FIGS. 6A-C illustrate an example scenario where audio from the second media device 125 interrupts audio from the first media device 120 and where the interrupted audio is from an incoming telephone call. For example, the user 130 may be watching television at the first media device 120, as illustrated in FIG. 6A. Subsequently, the user 130 may receive a phone call such as a voice call or video call at the second media device 125, as illustrated in FIG. 6B. The playback device 105 may recognize that the second media device 125 is receiving a call and may switch from playing audio corresponding to the television content, to the audio from the phone call. The user 130 may conduct the phone call using the speakerphone or other microphone imbedded at the second mobile device 125. That is, the microphone may pick up the user's voice, and the playback device 105 may emit the caller's voice. Once the phone call has finished, the playback device 105 may revert to playing audio corresponding to the television content, as illustrated in FIG. 6C. Thus, undue distraction from the television audio is avoided during the phone call.

Figure 7:
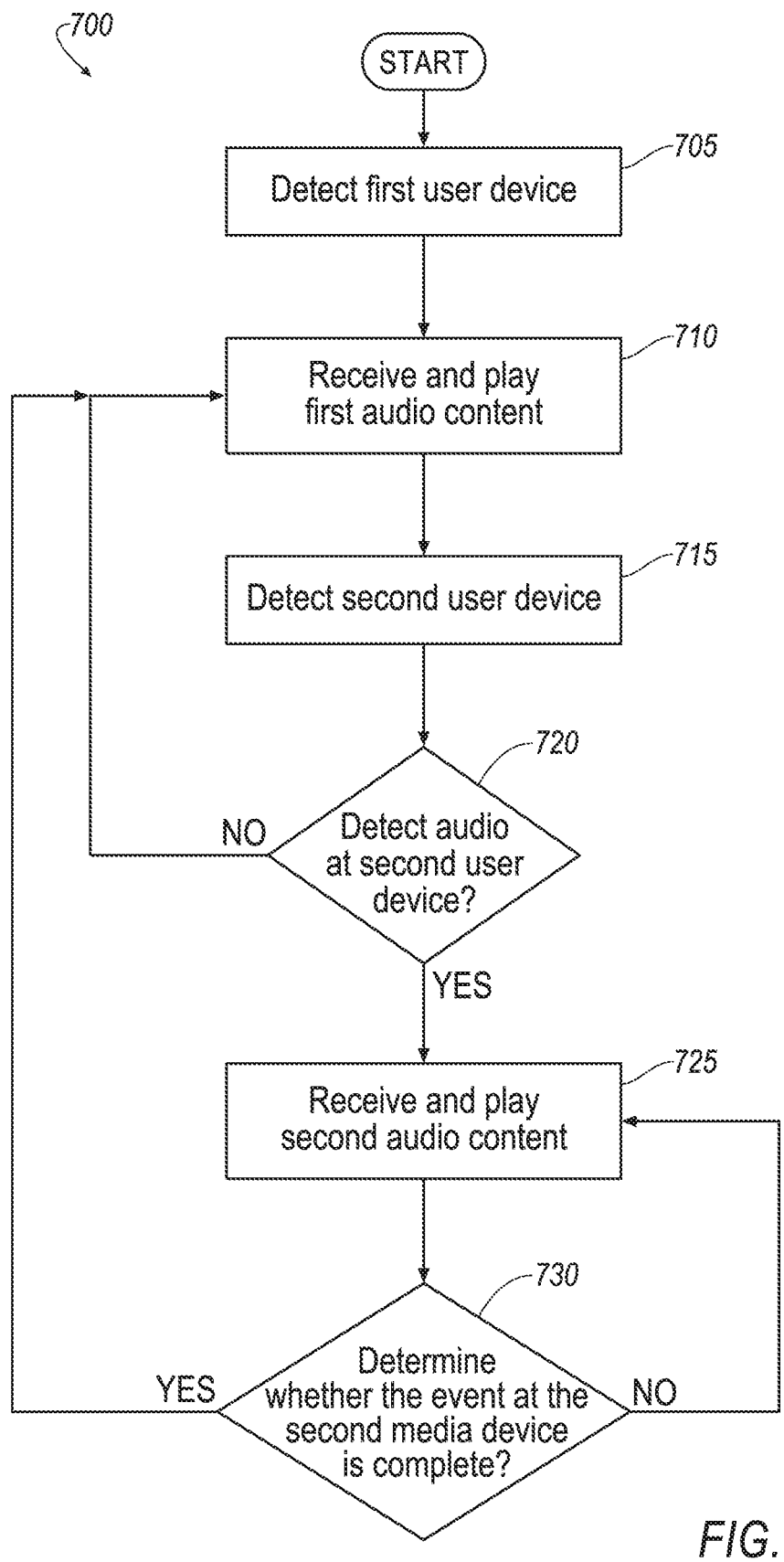
FIG. 7 illustrates an example flow chart for a process of the audio system.

FIG. 7 is an example flow chart for a process 700 of the audio system in accordance with one embodiment. The process begins at block 705 where the controller 205 of the playback device 105 recognizes or detects the first media device 120. In one example, the first media device 120 may be a relatively immobile or fixed device such as a television. Upon turning the television on, the playback device 105 may automatically recognize the television and begin receiving audio data therefrom.

At block 710, the controller 205 receives and plays first audio content corresponding to first playback content selected for playback at the first media device 120.

At block 715, the controller 205 recognizes the second media device 125. In one example, the second media device 125 may be a portable device used by the user such as a mobile phone or tablet. Upon coming within the wireless range of the playback device 105, the second media device 125 may automatically connect with the playback device 105.

At block 720, the controller 205 determines whether an event at the second media device 125 includes second audio content corresponding to the media content to be played at the second media device 125. As explained, the event may include playing a video clip, receiving a phone call, playing an audio file, etc. In one example, the controller 205 may determine whether incoming wireless audio signals are above a preset threshold volume level. Determination of whether incoming wireless audio signals are above the threshold is described in detail below with respect to FIG. 9. If the controller 205 receives indications of audio playback at the second media device 125, the process 700 may proceed to block 725. If not, the process 700 proceeds back to block 710 and the playback device 105 continues to play the first audio content.

At block 725, the controller 205 instructs the playback device 105 to playback second audio content corresponding to the second media device 125. The second audio content may continue to be played via the playback device 105 until the source of the audio content ceases (e.g., video clip ends, phone call ends, etc.).

At block 730, the controller 205 determines whether the event at the second user device 125 has been completed. That is, for example, has the video clip ended. If so, the process 700 may then proceed to block 710 and the playback device 105 may revert to playing the first audio content, until the video content associated therewith ends, or the first media device 120 is turned off.

If not, the playback device 105 may continue to play the second audio content until the event at the second media device 125 has ended, or has been stopped by the user.

Figure 8:
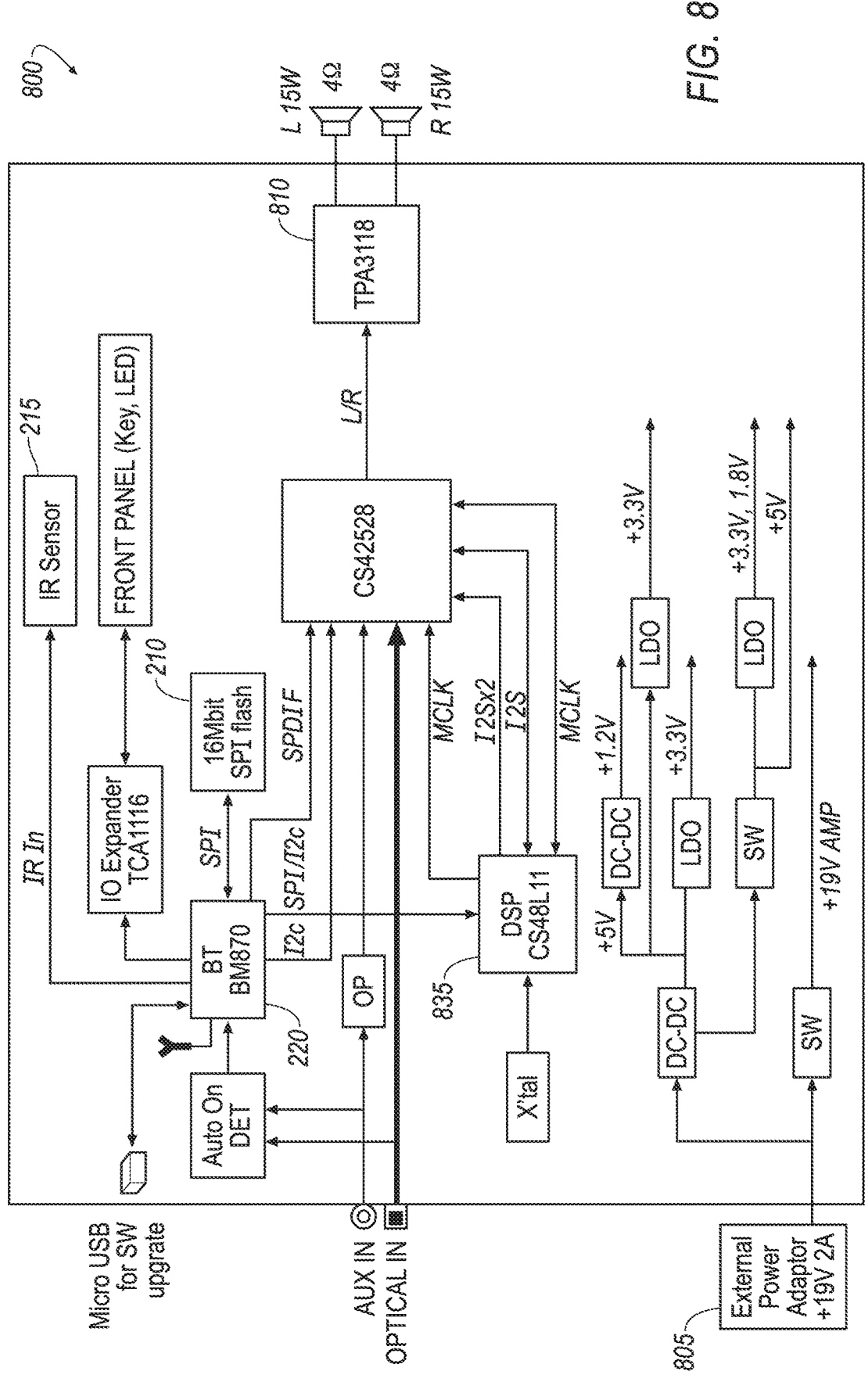
FIG. 8 illustrates an example hardware system for the audio system.

FIG. 8 illustrates an example hardware system 800 for the audio system 100. An auxiliary input AUX IN may be included to receive a wired connection from the television. The system 800 may include a signal processor 835, such as a ultra-low power audio digital signal processor (DSP) for processing the audio signals received from the media devices. Further, although not specifically shown, a separate analog mixer, such as an audio ducking circuit 905 described below with respect to FIG. 9, may be included as part of the system 800 in order to fade certain audio signals. In one example, instead of abruptly stopping audio output at the playback device 105 and restarting audio from a difference source, the transition may be less abrupt when using a fader to gradually fade-out the first audio playback and to gradually introduce the second audio playback.

The hardware system 800 may include a power adaptor 805 configured to provide power to the system 800 from an AC or other power source. The system 800 may include an amplifier 810 and at least a pair of speakers 225. As described above with respect to FIG. 2, the system 800 may include a user interface 215 such as an LCD or other touch-screen configured to receive user commands.

Figure 9:
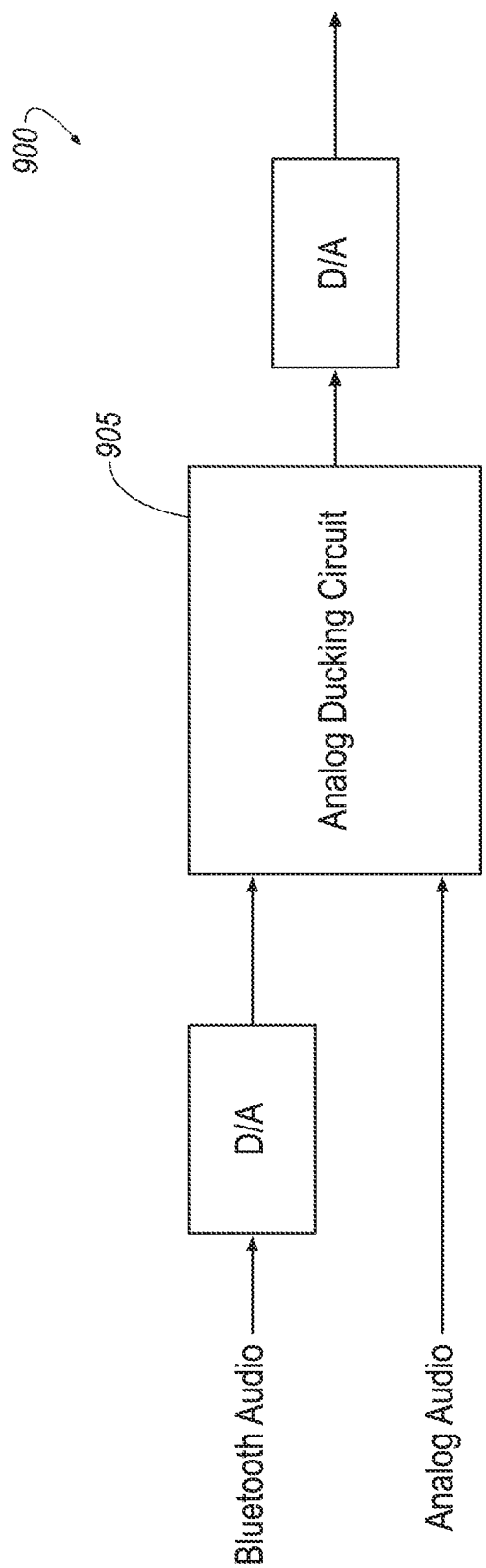
FIG. 9 illustrates another example hardware system for the audio system.

FIG. 9 illustrates an example hardware system 900 for the audio system 100 for switching the audio content at the playback device 105. The hardware system 900 may be included as part of the playback device 105 and may be part of or in communication with the controller 205. The hardware system 900 may also take the form of and be implemented via commands executed by the controller 205 or other computing device.

An example shown in FIG. 9 may be implemented for audio ducking where two incoming audio signals are received at an audio ducking circuit 905. Audio ducking may be an audio effect in which a level of one audio signal is reduced due to the presence of another audio signal. One of the audio signals may "duck" under another with higher priority. In this example, the Bluetooth® signal (or other wireless signal) from the second media device 125 may have a higher priority than an analog audio input, which may be associated with the first media device 120. Whenever the circuit 905 detects an incoming Bluetooth® signal having audio with an intensity above the preset threshold, the first media device audio is attenuated. When the ducking circuit 905 at the playback device 105 ceases to receive audio data from the second media device 125 via the Bluetooth® system, the playback device 105 recognizes that the Bluetooth signals has fallen below the threshold and the first media device audio is resumed. While an analog ducking circuit 905 is shown, it should be noted that in other examples ducking may be performed in the digital domain.

The threshold may include a certain minimum volume level. That is, if the audio ducking circuit 905 received data including audio content from the second media device 125 with a volume level over a certain intensity, the ducking circuit 905 may proceed to gradually reduce the volume of the first media device audio and gradually increase the volume of the second media device audio.

In addition to audio ducking relating to a present threshold minimum volume, the controller 205 may be configured to differential between events at the second media device 125 that are indicative of audio content related to media content or voice/video calls, and those events indicated of sounds that relate to notifications. For example, various notification sounds may be emitted from the second mobile device, including alerts as to text messages, emails, traffic and news alerts, etc. Due to the nature and short duration of these sounds, it may not be preferable or desirable to override the first audio content corresponding to the first media content for short notification sounds.

Thus, the controller 205 may differentiate between audio content related to media content and voice/video calls, and audio content corresponding to notifications. This differentiation may be achieved by determining a minimum length of the sound, for example, whether the sound is above a predefined length such as 0.5 second.

Accordingly, an audio system configured to play audio from multiple media devices is disclosed herein. The audio system prevents competition among the media devices for the user's attention by preempting audio from one device over another. Moreover, little-to-no additional interaction from the user may be required and no additional mobile applications, or other programs may be necessary in order to carry out the features described herein. Further, while the examples herein are discussed with respect to home audio systems, other audio systems may be included.

Computing devices described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A playback device for automatically switching between audio content received from a plurality of media devices, comprising:
    at least one speaker configured to emit first audio content corresponding to video content received from a first media device;
    a wireless transceiver configured to receive data from a second media device; and
    a processor configured to:
        receive an indication of an event at the second media device based on the data, the event indicative of second audio content to be played from the second media device, and
        instruct the at least one speaker to mute playback of the first audio content and to initiate playback of the second audio content without discontinuing playback of the video content at the first media device, wherein the event includes receiving a phone call at the second media device.

2. The playback device of claim 1, wherein the processor is further configured to:
    receive an indication of an event at a third media device, the event indicative of third audio content to be played from the third media device; and
    instruct the at least one speaker to initiate playback of the third audio content responsive to completion of the second audio content.

3. The playback device of claim 1, wherein the processor is further configured to:
    determine whether the second audio content is above a preset threshold minimum level of volume; and
    instruct the at least one speaker to decrease a volume of the playback of the first audio content and concurrently increase a volume of the playback of the second audio content in response to the second audio content being above the preset minimum threshold level of volume.

4. The playback device of claim 1, further comprising a user interface configured to receive user input at the playback device to control the video and first audio content.

5. The playback device of claim 1, further comprising an auxiliary input configured to communicate with the first media device.

6. The playback device of claim 1, wherein the first media device is a television and the second media device is one of a mobile phone or tablet computer.

7. The playback device of claim 1, wherein the first media device is configured to communicate with the processor via a wired connection and wherein the second media device is configured to communicate with the processor via a local area network connection.

8. An audio playback system configured to switch between a plurality of audio sources, comprising:
    a playback device including at least one speaker configured to emit first audio content corresponding to video content at a first media device, the playback device further including a processor configured to
        instruct the at least one speaker to discontinue playback of the first audio content corresponding to the video content at the playback device and to initiate playback of second audio content concurrent with playback of the video content at the first media device, the second audio content received from a second media device;
        determine whether the second audio content is above a preset threshold minimum level of volume; and
        instruct the at least one speaker to decrease a volume of the playback of the first audio content and concurrently increase a volume of the playback of the second audio content in response to the second audio content being above the preset threshold minimum level of volume.

9. The system of claim 8, wherein the processor is configured to receive an indication of the second audio content to be played at the second media device instead of the first audio content corresponding to the video content, the indication received in response to an event at the second media device indicating that the second audio content is to be played from the second media device.

10. The system of claim 9, wherein the event includes playing a video at the second media device.

11. The system of claim 9, wherein the event includes receiving a phone call at the second media device.

12. The system of claim 8, wherein the processor is further configured to instruct the at least one speaker to initiate playback of a third audio content received from a third media device responsive to completion of the second audio content.

13. The system of claim 8, wherein the processor is further configured to:
    determine whether the second audio content is above a preset threshold minimum level of volume; and
    instruct the at least one speaker to decrease a volume of the playback of the first audio content and concurrently increase a volume of the playback of the second audio content in response to the second audio content being above the preset threshold minimum level of volume.

14. The system of claim 8, further comprising a user interface configured to receive user input at the playback device to control the video and first audio content.

15. The system of claim 8, further comprising an auxiliary input configured to communicate with the first media device and wherein the first media device is a television and wherein the second media device is one of a mobile phone or tablet computer.

16. The system of claim 8, wherein the first media device is configured to communicate with the processor via a wired connection and wherein the second media device is configured to communicate with the processor via a local area network connection.

17. A method for switching audio output at a home theater playback device, comprising:
    receiving, from a first media device, first audio content corresponding to multimedia content at the first media device;

instructing the first audio content to be played via at least one speaker;

receiving, from a second media device, second audio content corresponding to media content at the second media device;

instructing the at least one speaker to mute playing the first audio content and to play the second audio content without discontinuing video content at the first media device; and instructing the at least one speaker to resume play of the first audio content in response to the second media content ending.

18. The method of claim 17, further comprising:

receiving, from a third media device, third audio content corresponding to media content at the third media device; and instructing the at least one speaker to play the third audio content in response to the second audio content ending.

19. The method of claim 17, further comprising:

determining whether the second audio content is above a preset threshold minimum level of volume; and instructing the at least one speaker to decrease a volume of the first audio content and concurrently increase a volume of the second audio content in response to the second audio content being above the preset threshold minimum level of volume.

20. A method for switching audio output at a home theater playback device, comprising:

receiving, from a first media device, first audio content corresponding to multimedia content at the first media device;

instructing the first audio content to be played via at least one speaker; receiving, from a second media device, second audio content corresponding to media content at the second media device;

instructing the at least one speaker to mute playing the first audio content and to play the second audio content without discontinuing video content at the first media device; and determining whether the second audio content is above a preset threshold minimum level of volume; and instructing the at least one speaker to decrease a volume of the first audio content and concurrently increase a volume of the second audio content in response to the second audio content being above the preset threshold minimum level of volume.

* * * * *